(12) United States Patent
Lupi et al.

(10) Patent No.: US 7,963,305 B2
(45) Date of Patent: Jun. 21, 2011

(54) FILLING VALVE HAVING A THREE-POSITION VALVE ROD

(75) Inventors: Andrea Lupi, Octeville-sur-Mer (FR); Fabrizio Vaia, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 815 days.

(21) Appl. No.: 11/997,116

(22) PCT Filed: Jul. 28, 2005

(86) PCT No.: PCT/EP2005/009209
§ 371 (c)(1),
(2), (4) Date: Jan. 28, 2008

(87) PCT Pub. No.: WO2007/016957
PCT Pub. Date: Feb. 15, 2007

(65) Prior Publication Data
US 2008/0283788 A1    Nov. 20, 2008

(51) Int. Cl.
*B67C 3/26* (2006.01)
(52) U.S. Cl. ......... 141/258; 141/255; 141/263; 141/301
(58) Field of Classification Search .................... 141/57, 141/144–147, 255–263, 301
See application file for complete search history.

(56) References Cited

U.S. PATENT DOCUMENTS

| | | | |
|---|---|---|---|
| 4,557,301 A | 12/1985 | Joerss | |
| 4,582,102 A * | 4/1986 | Risser | 141/95 |
| 5,735,434 A | 4/1998 | Rayner | |
| 6,817,386 B2 * | 11/2004 | Tsukano et al. | 141/57 |

FOREIGN PATENT DOCUMENTS

| | | |
|---|---|---|
| DE | 197 01 001 A1 | 7/1998 |
| EP | 0 770 574 A | 5/1997 |
| EP | 1 129 949 A | 9/2001 |
| FR | 2 785 598 A | 5/2000 |

OTHER PUBLICATIONS

H. W. Schnoor, "Die Abfuellung Von Fluessigkeiten Mit Pneumatisch Betaetigten Ventilen Filling of Liquid With Pneumatically Operated Valves", Fette, Seifen, Anstrichmittel, Industrieverlag Von Hernhaussen KG. Hamburg, DE, Oct. 1, 1970, pp. 890-894, vol. 72, No. 10; XP 002023444.

* cited by examiner

*Primary Examiner* — Timothy L Maust
(74) *Attorney, Agent, or Firm* — Sughrue Mion, PLLC

(57) ABSTRACT

Filling valve (5) including: a hollow housing (11) having a valve seat (25); a moving valve rod (14) slidingly mounted in the housing (11) and having a sealing surface (23), the moving valve rod (14) and the hollow housing (11) together defining a liquid chamber (18); a liquid inlet (26) for putting the liquid chamber (18) into communication with a liquid supply pipe (6); a device for putting the valve rod (14) in a first, full-open position, in which the sealing surface (23) is spaced from the valve seat (25), thereby forming a passage (27) for the liquid; a device for putting the valve rod (14) in a second, closed position, in which the sealing surface (23) is in sealing contact with the valve seat (25), thereby closing the passage (27), and a device for putting the valve rod (14) in a third, predetermined, semi-open position in which the sealing surface (23) is spaced from the valve seat (25) but closer to the same than in the full-open position.

8 Claims, 3 Drawing Sheets

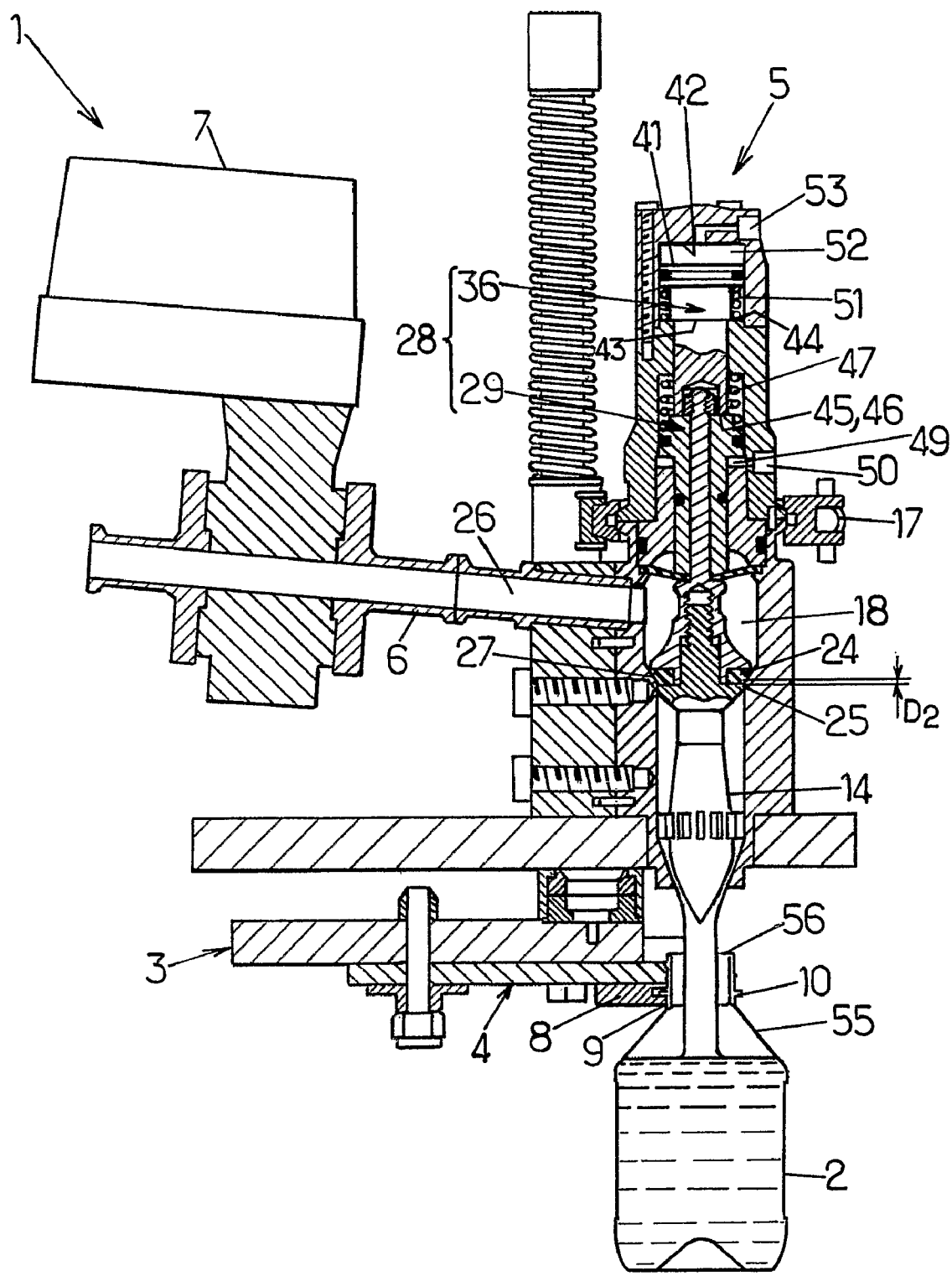

FILLING VALVE HAVING A THREE-POSITION VALVE ROD

FIELD OF THE INVENTION

The invention relates to a filling valve for filling a container with a filling liquid such as a beverage, to a filling machine including such a filling valve and to a method for filling a container.

BACKGROUND OF THE INVENTION

Though it is not limited to this particular technical field, the invention relates to the field of beverage bottling, in which there is a constant need of maximum aseptic filling conditions, in order to minimize contamination of the liquid by external agents. Asepsis can become a critical issue, for example in the case of milk bottling, and especially in raw milk bottling.

The design of filling machines must ever find a compromise between production rate and asepsis.

Production rates, on the one hand, require that the liquid be supplied with maximum flow rate to the container.

For example, EP 1 310 454 discloses a valve unit comprising a hollow body in which a plug is slidingly mounted and a guide means for the plug, a passage being formed in the hollow body for a liquid. The valve plug is integral with a piston associated to a pressurization chamber. Introduction of compressed air at a sufficient pressure in the pressurization chamber raises the piston to put the lug in an open state, thereby allowing the filling liquid to be supplied in the container. In such a structure, liquid flow rate depends upon the elevation height of the piston during the filling operation.

In theory, in order to maximize the flow rate, the piston should be elevated at the maximum height.

But, on the other hand, asepsis requires that the environment of the container be as clean as possible. In particular, splashes and overflowing should be minimized, for any droplet of liquid on the machine could become a substrate for bacterial development. This is why the filling liquid must, as far as possible, be supplied with great precision to the container.

In EP 1 310 454, the valve plug has a tip with a conical end portion having an ogival shape for guiding the liquid toward the mouth of the container. In addition, radial fins are provided on the valve plug in order to stabilize the liquid and avoid torsional movement thereof.

Although the fluid is supplied to the container in a laminar flow, turbulences appear when the level of liquid reaches the converging top portion of the container, in the vicinity of its neck. In order to avoid overflowing, a first common solution consists in limiting the liquid flow rate to minimize turbulences in the container. The main drawback of such a solution is that it unquestionably affects the production rates. A second solution consists in stopping the filling when the level of liquid is at a sufficient distance from the neck. This solution has two main drawbacks. First, the container needs to be over-dimensioned, which is material consuming. Second, there is in the filled container an important overlying volume of air, resulting in the customer thinking that the container is under-filled and therefore turning to another supplier. This is why the first solution is often preferred, despite its bad consequences on the production rates.

SUMMARY OF THE INVENTION

It is an object of the invention to provide a filling valve which overcomes the abovementioned drawbacks of the existing filling valves.

The proposed filling valve comprises:
a hollow housing having a valve seat;
a moving valve rod slidingly mounted in the housing and having a sealing surface, said moving valve assembly and said hollow housing together defining a liquid chamber;
a liquid inlet for putting said liquid chamber into communication with a liquid supply pipe;
means for putting said valve rod in a first, full-open position, in which said sealing surface is spaced from said valve seat, thereby forming a passage for the liquid,
means for putting said valve rod in a second, closed position, in which said sealing surface is in sealing contact with said valve seat, thereby closing said passage, and
means for putting said valve rod in a third, predetermined, semi-open position in which said sealing surface is spaced from the valve seat but closer to the same than in the full-open position.

Operation of this valve leads to a new method for filling a container with a liquid, including the steps of:
introducing in the container a first, predetermined volume of liquid at a first, predetermined flow rate,
introducing in the container a second, predetermined volume of liquid at a second, predetermined flow rate lower that the first flow rate.

Accordingly, in a first phase, the liquid is supplied to the container at a high flow rate. In a second phase (in practice as soon as the level of liquid in the container has reached the converging portion near the neck) the liquid is supplied at a lower flow rate. This permits to maximize the production rate while avoiding overflowing.

The above and other objects and advantages of the invention will become apparent from the detailed description of preferred embodiments, considered in conjunction with the accompanying drawings.

BRIEF DESCRIPTION OF THE DRAWINGS

FIG. 3 is an elevational section view showing the filling valve of FIG. 1, in a semi-open position.

DESCRIPTION OF A PREFERRED EMBODIMENT

Figure 1:
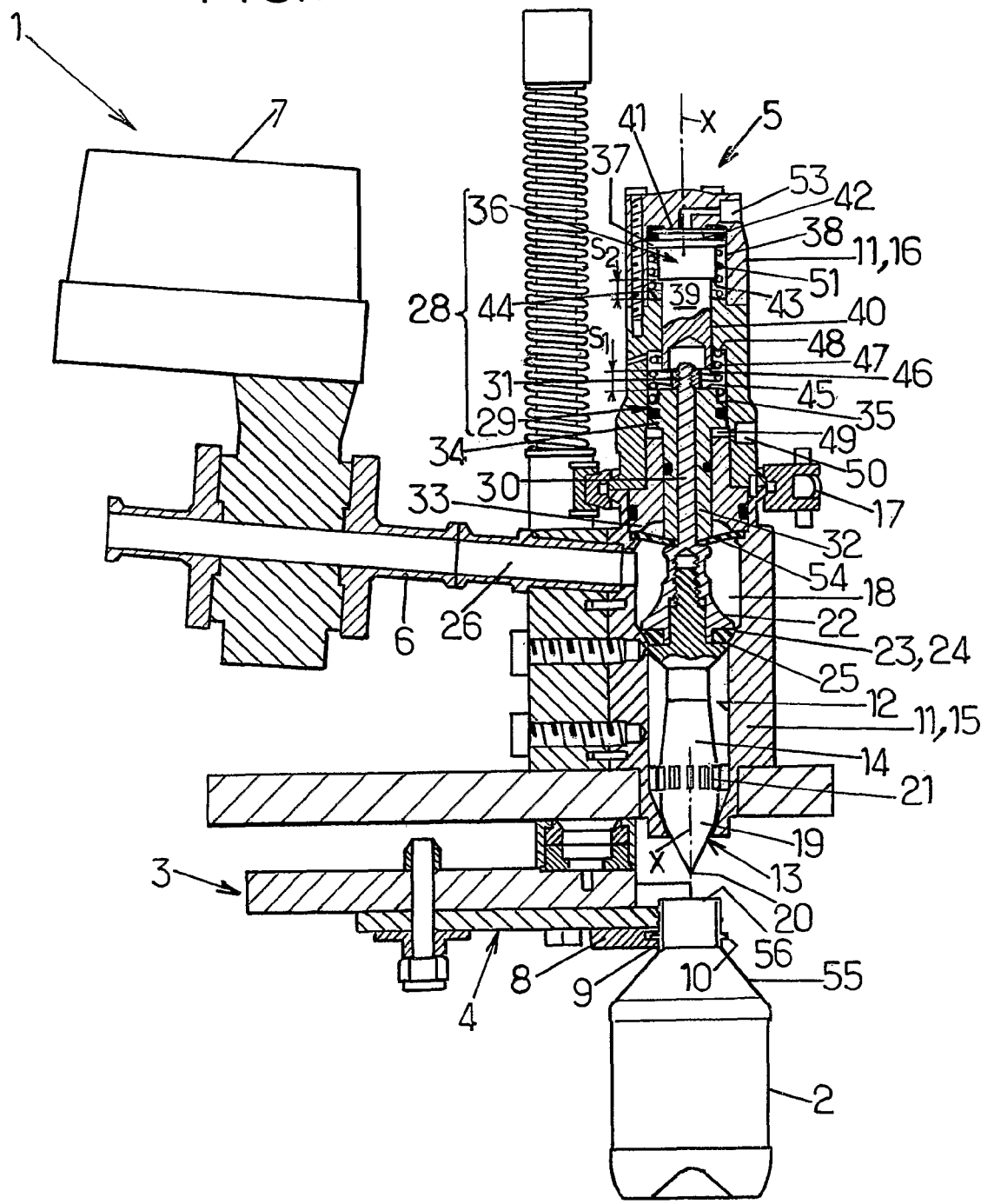
FIG. 1 is a partial elevational section view of a filling machine equipped with a filling valve according to the invention, shown in a closed position.

Referring now to the figures, there is partly shown a filling machine 1 for filling containers 2 with a non-pressurized (non-gaseous) filling liquid, such as juice, milk, tea or the like.

The filling machine 1 includes:
a storage tank (not shown) where the liquid is maintained at a substantially constant level,
a rotating carrousel having a plate 3 provided with a plurality of peripheral container supporting arrangements 4 (one of which is partly shown on the figures),
a plurality of corresponding filling valves 5,
a plurality of radial liquid supply pipes 6, for putting into communication the storage tank and each filling valve 5 via a flow meter 7.

The container supporting arrangement 4 includes a support arm 8, a radial end 9 of which is forked to cooperate with a collar 10 of a container 2 which is thereby held in position to be filled through the corresponding filling valve 5.

The filling valve 5 comprises a cylindrical hollow housing 11 having an inner bore 12 formed around a vertical main axis X and opened to form an aperture 13 at a bottom end thereof, and a moving valve rod 14 slidingly mounted in the housing 11 along the main axis X.

The housing 11 comprises two superposed hollow stages, i.e. a hollow body 15, where the bore 12 is formed, and a hollow head 16 mounted above and removably attached to the hollow body 15 by means of an annular clamp 17.

The valve rod 14 and the hollow body 15 together define a liquid chamber 18 formed between the outer periphery of the valve rod 14 and the inner periphery of the bore 12.

As depicted on the figures, the valve rod 14 is shell-shaped and has a conical lower portion 19 having an anti-droplet sharp-pointed tip 20. The conical lower portion 19 also has a plurality of radial fins 21 cooperating with the inner periphery of the bore 12 for preventing any torsional movement of the filling liquid during filling operations.

The valve rod 14 has an upper radially enlarged portion 22 defining an annular contact sealing surface 23 formed by a seal element 24 which abuts, in a liquid tight manner, against a corresponding conical valve seat 25 formed in the hollow body 15, in a closed position of the valve rod 14 (shown on FIG. 1).

The valve 5 also comprises a liquid inlet 26 formed by a through hole in the hollow body 15 for putting the liquid chamber 18 in communication with the liquid supply pipe 6.

Figure 2:
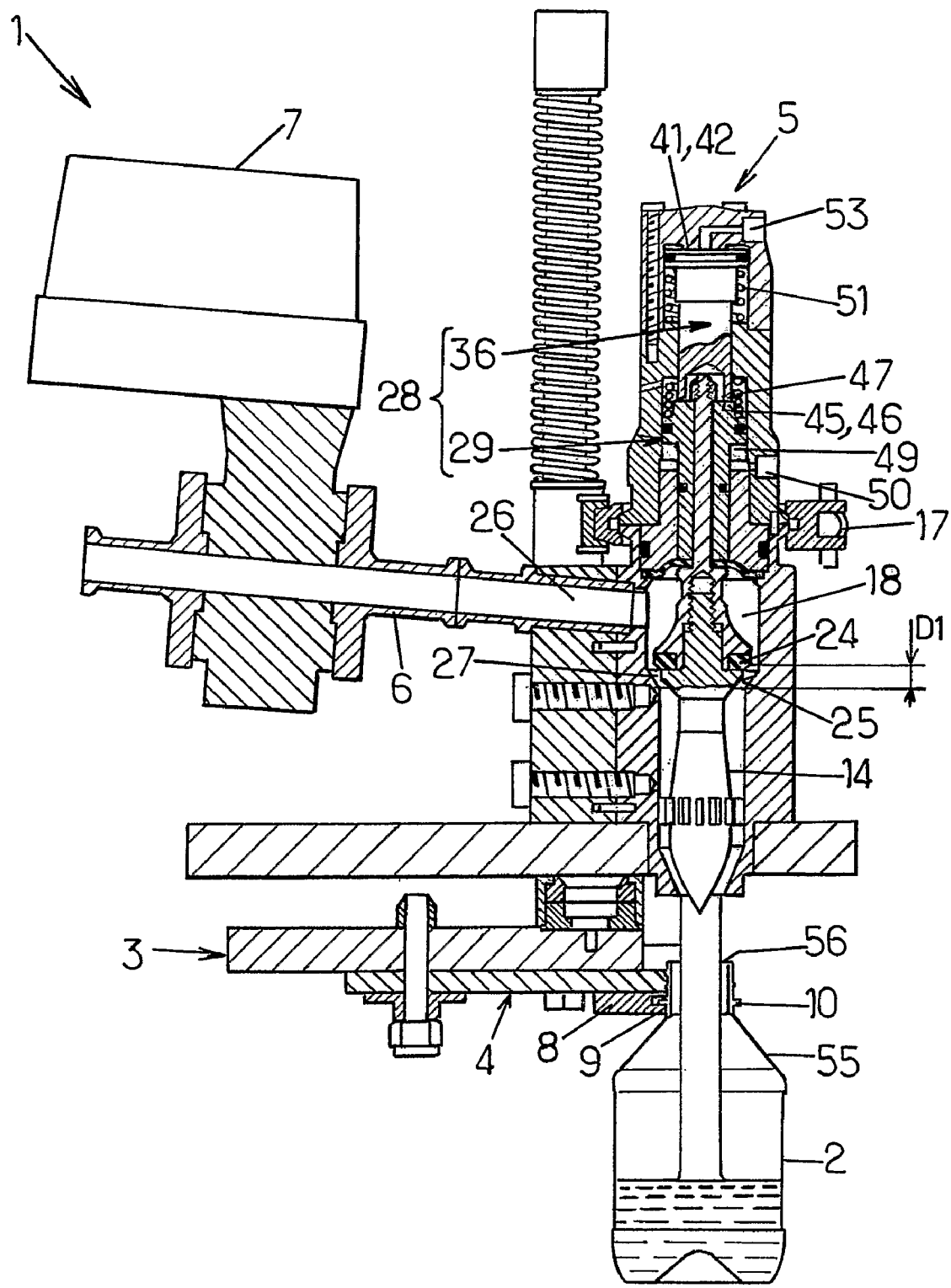
FIG. 2 is an elevational section view showing the filling valve of FIG. 1, in a full-open position.

The valve rod 14 is axially movable with respect to the housing 11, along the main axis X, under certain conditions which will be disclosed hereafter, between:
- an full-open position (FIG. 2) in which the sealing surface 23 is spaced from the valve seat 25 at a first predetermined distance D1, thereby forming a passage 27 for the liquid to flow from the liquid chamber 18 to the container 2,
- a closed position (FIG. 1) in which the sealing surface 23 is in liquid tight contact with the valve seat 25, thereby closing the passage 27 and preventing the liquid from flowing from the liquid chamber 18 to the container 2, and also
- a semi-open position (FIG. 3) in which the sealing surface 23 is spaced from the valve seat 25 at a second, predetermined distance D2 which is smaller than the first distance D1. In other words, in the semi-open position, the sealing surface 23 is closer to the valve seat 25 than in the full-open position.

The valve 5 comprises a piston system 28 to move the valve rod 14 to each of its positions. This piston system 28 includes a first, lower piston 29, rigidly attached to the valve rod 14 and slidingly mounted with respect of the hollow head 16 along the main axis X. More precisely, the valve rod comprises an upwardly protruding shaft 30 which is inserted in a corresponding bore coaxially formed in the lower piston 29 and at a top end of which a bolt 31 is screwed to permanently fix together the lower piston 29 and the valve rod 14.

The lower piston 29 comprises:
- a cylindrical piston body 32, which is slidingly mounted, along the main axis X, in a guiding sleeve 33 which is, in turn, mounted in the housing 11 substantially at the junction between the hollow body 15 and the hollow head 16, and
- a cylindrical piston head 34 formed by an annular flange, slidingly received in a corresponding bore 35 formed in the hollow head 16.

The piston system 28 also comprises a second, upper piston 36 which is coaxial with but detached from the lower piston 29, and which is slidingly mounted in the hollow head, along the main axis X. The upper piston 36 comprises:
- a cylindrical piston head 37 formed by an annular flange, slidingly received in a corresponding bore 38 formed in the hollow head 16, and
- a cylindrical piston body 39 slidingly received in a corresponding bore 40 formed in the hollow head 16 between the bores 35 and 38.

The upper piston 36 is moveable, with respect to the hollow head 16, between:
- an upper position (FIGS. 1, 2), in which a top end surface 41 of the upper piston head 37 comes into abutment against an upper stop surface 42 formed on the hollow head 16 at an upper end of the bore 38, and
- a lower position (FIG. 3), in which a peripheral shoulder surface 43 formed on the piston body 39 comes into abutment with a lower stop surface 44 formed in the hollow head 16, at a lower end of the bore 38. The upper piston 36 thereby defines between these positions a stroke $S_2$ which is equal to the distance between the shoulder surface 43 and the lower stop surface 44 when the upper piston 36 is in its upper position (FIG. 1).

The lower piston 29 is moveable, with respect to the hollow head 16, between:
- an lower position (FIG. 1), corresponding to the closed position of the valve rod 14, in which the lower piston 29 is spaced from the upper piston 36,
- an upper position (FIG. 2), corresponding to the full-open position of the valve rod 14, in which a top end surface 45 of the piston head 34 comes into abutment against a bottom end surface 46 of the upper piston body 39 while the latter is in its upper position, and
- an intermediate position (FIG. 3), corresponding to the semi-open position of the valve rod 14, in which the top end surface 45 of the piston head 34 comes into abutment against the bottom end surface 46 of the upper piston body 39 while the latter is in its lower position.

The lower piston 29 defines between its upper and lower positions a stroke $S_1$ which is equal to the distance between the top end surface 45 of the piston head 34 and the bottom end surface 46 of the upper piston body 39 when the lower piston 29 is in its lower position while the upper piston 36 is in its upper position (FIG. 1).

As depicted on the figures, the valve 5 further comprises a lower compression return spring 47, interposed between the piston head 34 and a shoulder surface 48 formed on the hollow head 16, which spring permanently biases the lower piston 29 toward its lower position.

A first, lower pressurization chamber 49, is defined in the bore 35 between the guiding sleeve 33 and the piston head 34 on the side opposite the lower return spring 47, and a first, lower gas inlet 50, is formed by a through hole in the hollow head 16 to put the lower pressurization chamber 49 in communication with a lower gas duct (not shown) connected to the hollow head 16, whereby introduction of pressurized gas (such as air) through the lower gas inlet 50 in the lower pressurization chamber 49, at a sufficient pressure, biases the lower piston 29 toward its upper position against the force exerted on the lower piston 29 by the lower return spring 47.

As depicted on the figures, the valve 5 also comprises an upper compression return spring 51, interposed between the lower stop surface 44 and the upper piston head 37, which permanently biases the upper piston 36 toward its upper position.

A second, upper pressurization chamber 52, is defined in the bore 38 between the upper stop surface 42 of the hollow head 16 and the top end surface 41 of the upper piston head 37

(i.e. on the side opposite the upper return spring 51), and a second, upper gas inlet 53, is formed by a through hole in the hollow head 16 to put the upper pressurization chamber 52 in communication with an upper gas duct (not shown) connected to the hollow head 16, whereby introduction of pressurized gas (such as air) through the upper gas inlet 53 in the upper pressurization chamber 52, at a sufficient pressure, biases the upper piston 36 toward its lower position against the force exerted on the upper piston 36 by the upper return spring 51.

The valve 5 further comprises a diaphragm 54 made of a resilient material such as an elastomer, which links in a gastight and liquid-tight manner the valve rod 14 and the housing 11 at a top end of the liquid chamber 18, in order to allow movement of the valve rod 14 while preventing any liquid leakage from the liquid chamber 18 to the lower pressurization chamber 49, and also to prevent any gas leakage from the lower pressurization chamber 49 to the liquid chamber 18. More precisely, the diaphragm 54, which is washer-shaped, has an inner edge which is sealingly (liquid and gas-tight) held between the lower piston 29 and the valve rod 14, and a peripheral outer edge which is sealingly held between the hollow body 15 and the guiding sleeve 33.

The filling operations are now described, with reference to the figures, starting from the closed position of the valve rod 14, as depicted on FIG. 1.

In the closed position, no pressurized air is introduced in the lower and upper pressurization chambers 49, 52, so that the upper piston 36 is put in its upper position under the biasing force of the upper return spring 51, whereas the lower piston 29 is put in its lower position under the biasing force of the lower return spring 47, thereby putting the valve rod 14 in its closed position in which the seal element 24 is in sealing contact with the valve seat 25, thus preventing the liquid from flowing from the liquid chamber 18 to the container 2. It should be noted that the liquid exerts on the enlarged portion 22 an additional force, oriented downwardly, which biases the valve rod 14 towards it closed position.

As soon as the container 2 is ready to be filled, pressurized air is introduced in the lower pressurization chamber 49, whereas no pressurized air is introduced in the upper pressurization chamber 52 yet, whereby the lower piston 29 is elevated until it reaches its upper position, in which it comes into abutment against the upper piston 36 as described above, thereby putting the valve rod 14 in its full-open position in which the distance D1 between the seal element 24 and the valve seat 25 is equal to the stroke $S_1$ of the lower piston 29, and allowing the liquid to flow at a predetermined, high flow rate from the liquid chamber 18 to the container 2.

Once a first predetermined volume of liquid has been supplied to the container 2 (measurement is achieved through the flow meter 7), corresponding for example to the volume of the container located below a converging upper portion 55 thereof, that is its shoulder part, where turbulences may appear under the supplying conditions of the high flow rate, pressurized gas is supplied at the same time to the lower pressurization chamber 49 and to the upper pressurization chamber 52, whereby the upper piston 36 is displaced to its lower position, pushing the lower piston 29 to its intermediate position where it is then blocked under equilibrium of the forces exerted by the upper piston 36, air pressure in the lower pressurization chamber 49 and the lower compression return spring 47 (considering weight as negligible with respect to such forces). As the stroke $S_2$ of the upper piston 36 is lower than the stroke $S_1$ of the lower piston 29, the valve rod 14 is then put in its semi-open position, in which the distance D2 between the seal element 24 and the valve seat 25 is equal to the difference $S_1$-$S_2$ between the stroke $S_1$ of the lower piston 29 and the stroke $S_2$ of the upper piston 36. In other words, in the semi-open position, the seal element 24 is spaced from the valve seat 25 but closer to it than in the full-open position. Accordingly, liquid is supplied to the container 2 at a lower flow rate (i.e. lower than the high flow rate), thereby preventing turbulences from arising in the liquid as it reaches the neck 56 of the container 2.

Once a second, predetermined volume of liquid, corresponding to the difference between the final volume of liquid to be supplied to the container 2 and the first volume supplied under high flow rate, has been supplied to the container 2, both gas supplies are stopped, whereby, under bias of the lower and upper return springs 47, 51, the lower and upper pistons 29, 36 are put again in their upper and lower positions, respectively, thereby putting the valve rod 14 in its closed position and stopping liquid supply to the container 2.

Accordingly, the liquid can be supplied to the container 2 with maximum speed but no (or at least lower) risk that as the liquid reaches the neck 56 turbulences arise in the container 2, which would otherwise generate overflowing and/or splashes. Asepsis and production rate can thereby simultaneously be increased.

In addition, the annular clamp 17 allows for simple and quick maintenance of the piston system 28 (for example when for any reason a return spring 47 and/or 51 must be replaced) with no risk of contamination of the liquid, since the diaphragm 54 provides a liquid and gas tight separation between the hollow body 15 and the hollow head 16.

The invention claimed is:
1. Filling valve (5) comprising:
a hollow housing (11) having a valve seat (25);
a moving valve rod (14) slidingly mounted in the housing (11) and having a sealing surface (23), said moving valve rod (14) and said hollow housing (11) together defining a liquid chamber (18);
a liquid inlet (26) for putting said liquid chamber (18) into communication with a liquid supply pipe (6);
a first piston (29) rigidly attached to the valve rod (14), slidingly mounted in the housing (11) and defining with respect to the same a first stroke ($S_1$) between an upper position where the first piston (29) puts said valve rod (14) in a first, full-open position, in which said sealing surface (23) is spaced from said valve seat (25), thereby forming a passage (27) for the liquid, and an lower position where the first piston (29) puts said valve rod (14) in a second, closed position, in which said sealing surface (23) is in sealing contact with said valve seat (25), thereby closing said passage (27),
a second piston (36) slidingly mounted in the housing (11) and defining with respect of the same a second stroke ($S_2$) shorter than said first stroke, between an upper position in which the second piston (36) permits the first piston (29) to reach its upper position, and a lower position in which the second piston (36) blocks the first piston (29) in an intermediate position where the first piston (29) puts said valve rod (14) in a third, predetermined, semi-open position in which said sealing surface (23) is spaced from the valve seat (25) but closer to the same than in the full-open position,
characterized in that said first piston (29) has a top end surface (45) which, in the upper and intermediate positions, comes into abutment with a bottom end surface (46) of the second piston (36).

2. Filling valve (5) according to claim 1, wherein said second piston (36) has a shoulder surface (43) which, in the lower position, comes into abutment against a lower stop surface (44) formed in the housing (11).

3. Filling valve (5) according claim 1, wherein said second piston (36) has a top end surface (41) which, in the upper position, comes into abutment against an upper stop surface (42) formed in the housing (11).

4. Filling valve (5) according to claim 1, further comprising:
- a first return spring (47), interposed between the housing (11) and the first piston (29), which permanently biases the same toward its lower position,
- a first pressurization chamber (49),
- a first gas inlet (50) for putting said first pressurization chamber (49) in communication with a first gas duct, whereby introduction of gas in the first pressurization chamber (49) at a sufficient pressure biases the first piston (29) toward its upper position against the first return spring (47).

5. Filling valve (5) according to claim 4, further comprising:
- a second return spring (51), interposed between the housing (11) and the second piston (36), which permanently biases the same toward its upper position,
- a second pressurization chamber (52),
- a second gas inlet (53) for putting said second pressurization chamber (52) in communication with a second gas duct, whereby introduction of gas in the second pressurization chamber (52) at a sufficient pressure biases the second piston (36) toward its lower position against the second return spring (51).

6. Filling valve (5) according to claim 1, wherein said housing (11) comprises:
- a hollow body (15) where the liquid chamber (18) is formed,
- a hollow head (16) in which the pistons (29, 36) are slidingly mounted, said hollow head (16) being mounted above the hollow body (15) and removably attached to the same.

7. Filling valve (5) according to claim 1, further comprising a
- diaphragm (54) linking the valve rod (14) to the housing (11).

8. Filling machine (1) comprising one or more valves according to claim 1.

* * * * *